US006971483B2

(12) United States Patent
Houston (10) Patent No.: US 6,971,483 B2
(45) Date of Patent: Dec. 6, 2005

(54) BRAKING APPARATUS AND METHOD FOR MAKING AND USING THE SAME

(76) Inventor: Eryn Houston, 23 Dapplegray Rd., Bell Canyon, CA (US) 91307

( * ) Notice: Subject to any disclaimer, the term of this patent is extended or adjusted under 35 U.S.C. 154(b) by 0 days.

(21) Appl. No.: 10/683,144

(22) Filed: Oct. 10, 2003

(65) Prior Publication Data

US 2005/0077119 A1    Apr. 14, 2005

(51) Int. Cl.[7] .............................................. B62B 17/08
(52) U.S. Cl. .............................. 188/8; 188/32; 280/605
(58) Field of Search ............................... 188/5, 6, 7, 8, 188/32; 280/604, 605, 608

(56) References Cited

U.S. PATENT DOCUMENTS

| 1,554,737 | A | * | 9/1925 | Knittel | 280/605 |
|---|---|---|---|---|---|
| 2,781,200 | A | * | 2/1957 | Robison | 280/826 |
| 2,828,135 | A | * | 3/1958 | Koci | 280/605 |
| 3,704,024 | A | * | 11/1972 | Martin | 280/605 |
| 4,101,145 | A | * | 7/1978 | Korger | 280/605 |
| 4,234,207 | A | * | 11/1980 | De Vigili | 280/605 |
| 5,673,772 | A | * | 10/1997 | Martin | 188/6 |
| 5,860,492 | A | | 1/1999 | Talaska | |
| 6,702,315 | B2 | * | 3/2004 | Barbieri et al. | 280/605 |

FOREIGN PATENT DOCUMENTS

CH        652038      * 10/1985

OTHER PUBLICATIONS

U.S. Appl. No. 09/815,191, filed Nov. 28, 2002, Freemon.
U.S. Appl. No. 10/059,967, filed Jul. 31, 2003, Comden.

* cited by examiner

Primary Examiner—Robert A. Siconolfi
Assistant Examiner—Devon Kramer
(74) Attorney, Agent, or Firm—Marcus Risso (57) ABSTRACT

The present invention relates to an apparatus for controlling a velocity of an object, and more specifically, to a braking apparatus to be attached with a piece of snow-sporting-equipment. The braking apparatus comprises a brake bracket with a deployable braking section. The deployable braking section may be actuated through use of a user-operated control. When actuated, the deployable braking section is forced into a snow's surface, creating drag and friction in order to control the snow-sporting-equipment's terrestrial velocity.

26 Claims, 7 Drawing Sheets

BRAKING APPARATUS AND METHOD FOR MAKING AND USING THE SAME

FIELD OF INVENTION

The present invention relates to an apparatus for controlling a velocity of an object, and more specifically, to a braking apparatus to be attached with a piece of snow-sporting-equipment, whereby when a deployable braking section is actuated, the deployable braking section creates drag and friction in order to control the snow-sport-equipment's terrestrial velocity.

BACKGROUND OF INVENTION

In pursuit of recreational sports, sporting enthusiasts have created a myriad of recreational sporting equipment. While the sporting equipment is often devised in pursuit of speed and mobility, braking aspects are often neglected or overlooked altogether. Although a user may appreciate speed, an ability to slow oneself is an integral part of recreational sports, particularly snow sports where a user's velocity may rapidly increase. Novice snow sport enthusiasts often find themselves traveling uncontrollably at dangerously excessive speeds. As such, a need exists for a braking system for recreational snow-sporting-equipment.

Recently, attempts have been made to add braking systems to various forms of recreational sporting equipment. For example, U.S. Pat. No. 5,860,492, issued to Talaska, discloses a hand-activated brake as attached with in-line roller skates. While the Talaska patent functions sufficiently to control in-line skates, it includes inherent problems. The Talaska patent is specifically devised for in-line skates, preventing it from working properly with other forms of sporting equipment, particularly snow-sporting-equipment.

Furthermore, the device disclosed by the Talaska patent is unacceptably dangerous. The Talaska patent discloses using a rigid, elongated rod in order to slow the user. While unfortunate, it is entirely possible that a falling user may impale himself on the rod.

U.S. patent application Ser. No. 10/059,967, by Comden, was disclosed in an effort to devise a braking system specifically suited for a snow sport. The Comden application teaches a braking system attached with a snow scooter, where the braking system is made up of a hinge, a spring, and a piece of material that digs into snow when stepped on. Although the device disclosed by the Comden application works sufficiently with a snow scooter, it would be incompatible with snow-sporting-equipment where a user's feet are stationary, such as with a snowboard or a pair of skis.

U.S. patent application Ser. No. 09/815,191, by Freemon, discloses a braking system for use with a snowboard. The braking system in the Freemon application uses a spring loaded lever arm to slow a run-away snowboard. The spring loaded lever arm is held back when a user is strapped in with a snowboard's binding. Upon removing a boot from the snowboard's binding, the lever arm automatically swings out and is forced into snow, functioning as a brake to slow the snowboard. While the Freemon application effectively slows a run-away snowboard, it does not have any user-operated controls and does little to aide a novice in controlling a velocity of the snowboard.

Therefore, there exists a need to present a safe, userly operated braking system that can be attached with a piece of snow-sporting-equipment. In this regard, the present invention substantially fulfills this need.

SUMMARY OF INVENTION

The present invention comprises a rider-operated, snow-sporting-equipment braking apparatus, permitting a rider to control a snow-sporting-equipment's terrestrial velocity. The braking apparatus comprises a brake bracket for attaching with a piece of snow-sporting-equipment. A deployable braking section is pivotally attached with the brake bracket, allowing pivotal movement relative to the brake bracket. A user-operated control is operably attached with the deployable braking section, whereby through user manipulation, the deployable braking section is actuated to control the snow-sporting-equipment's terrestrial velocity.

In another aspect, the brake bracket further comprises two opposing sides, where each of the two opposing sides have a top portion and a bottom portion. An adjustable fastener connects the two opposing sides.

Additionally, the brake bracket is removably attached with the snow-sporting-equipment. The brake bracket may be removably attached with a snow-sporting-equipment by adjusting the adjustable fastener to bring the two opposing sides in such a position as to accommodate a width of the snow-sporting-equipment. The top portion is then tightened with the bottom portion, thereby compressing an edge of the snow-sporting-equipment between the top portion and the bottom portion.

In yet another aspect, the brake bracket further comprises a slot located on an interior rim. The slot is shaped to conform with an edge of the snow-sporting-equipment, thereby allowing the brake bracket to be firmly secured with an edge of the snow-sporting-equipment.

Additionally, the deployable braking section further comprises an inside portion with a downward sloping wedge shape. When deployed, the wedge shape allows the inside portion to cut into snow upon surface engagement and control the snow-sporting-equipment's terrestrial velocity.

In another aspect, the deployable braking section further comprises an outside portion with a upward sloping shape, whereby upon surface engagement, the upward sloping shape reduces friction and drag.

Furthermore, the user-operated control is a hand operated control.

In yet another aspect, the brake bracket further comprises an attachment for attaching with a flexible control. Additionally, the snow-sporting-equipment further comprises a flexible control attaching the user-operated control with the deployable braking section. Furthermore, the flexible control is a cable linkage.

In another aspect, the deployable braking section further comprises rounded ends with a recessed track, thereby accommodating a cable linkage. When attached with the cable linkage, a user may use the user-operated control to deploy the deployable braking section through use of the cable linkage.

In yet another aspect, the snowboard braking apparatus further comprises friction wings pivotally attached with the deployable braking section. When utilizing the snow-sporting-equipment, the friction wings swing out to engage with a snow surface, creating drag and friction in order to control the snow-sporting-equipment's terrestrial velocity.

In another aspect, the snow-sporting-equipment is a snowboard.

In yet another aspect, the user-operated control is operably attached with the deployable braking section through an electronic connection.

In another aspect, the electronic connection is a wireless connection.

Additionally, it is another objective of the present invention to claim a method for making a rider-operated, snow-sporting-equipment braking apparatus. The method comprises an act of attaching a deployable braking section with a brake bracket, thereby allowing pivotal movement relative to the brake bracket. The method also comprises an act of operably attaching a user-operated control with the deployable braking section, whereby through user manipulation, the deployable braking section is actuated to control the snow-sporting-equipment's terrestrial velocity.

Additionally, in the act of attaching the deployable braking section with the brake bracket, the brake bracket further includes two opposing sides, where each of the two opposing sides have a top portion and a bottom portion, and an adjustable fastener connecting the two opposing sides. The brake bracket may be removably attached with a snow-sporting-equipment by adjusting the adjustable fastener to bring the two opposing sides in such a position as to accommodate a width of the snow-sporting-equipment and tightening the top portion with the bottom portion, thereby compressing an edge of the snow-sporting-equipment between the top portion and the bottom portion.

Furthermore, in the act of operably attaching a user-operated control with the deployable braking section, the user-operated control is a hand-operated control.

Additionally, it is yet another objective of the present invention to claim a method for using a rider-operated, snow-sporting-equipment braking apparatus. The method comprises an act of manipulating a user-operated control to deploy a deployable braking section, whereby through deployment, the deployable braking section engages with a snow surface to control the snow-sporting-equipment's terrestrial velocity.

Finally, in the act of manipulating the user-operated control to deploy the deployable braking section, the user-operated control is a hand-operated control.

BRIEF DESCRIPTION OF THE DRAWINGS

The nature of the braking apparatus described herein will be readily apparent in the following drawings, in which.

DETAILED DESCRIPTION

The present invention relates to an apparatus for slowing a velocity of an object, more particularly, to a braking apparatus to be attached with a piece of snow sport equipment, whereby when a deployable braking section is actuated, the deployable braking section creates drag and friction in order to control the snow sport equipment's terrestrial velocity.

The following description, taken in conjunction with the referenced drawings, is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

Figure 1:
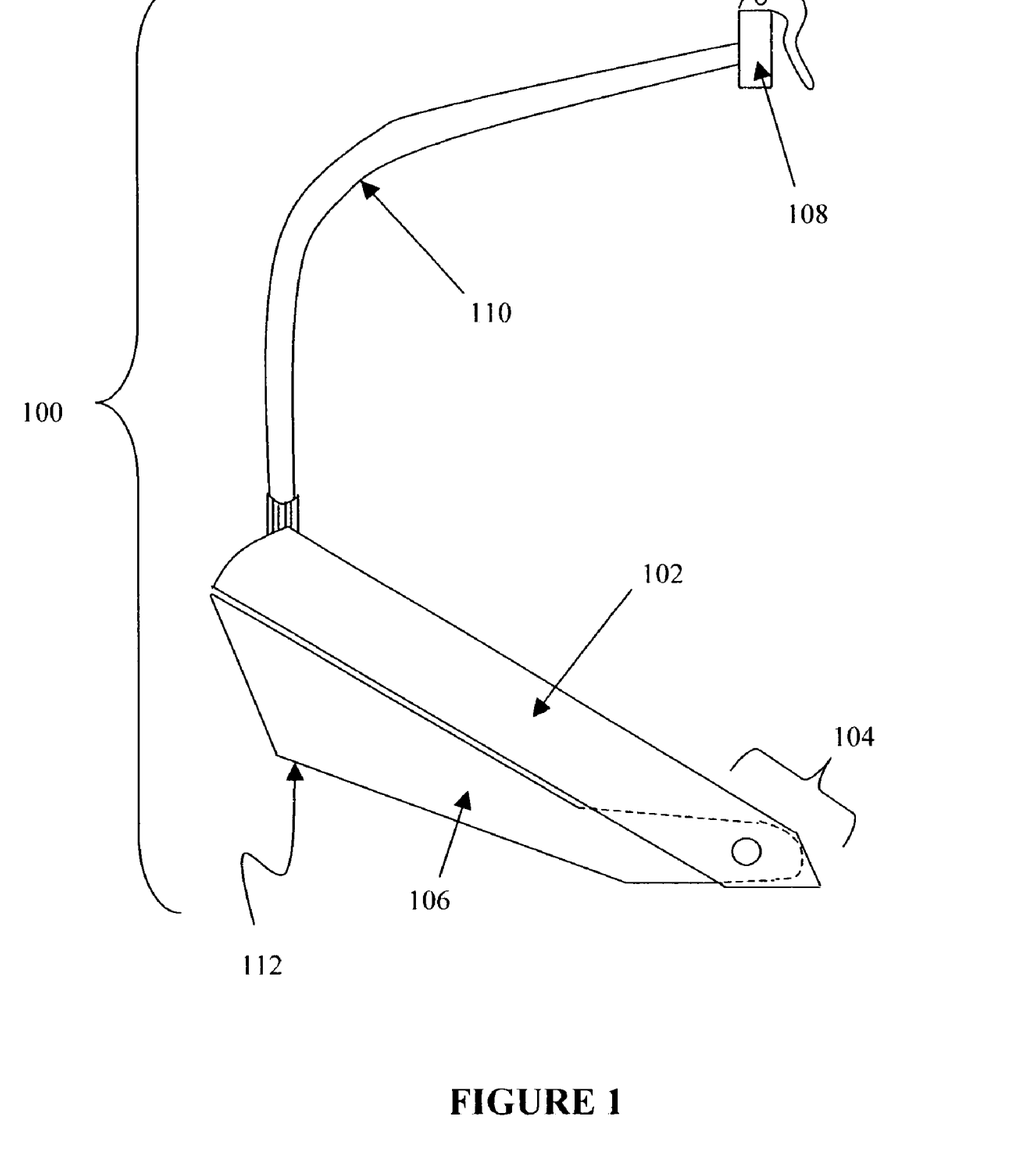
FIG. 1 is a side perspective view of a braking apparatus according to the present invention.

Referring to the figures, FIG. 1 illustrates a rider-operated, snow-sporting-equipment, braking apparatus 100. The braking apparatus 100 is constructed such that it may be removably attached with any suitable plank-style snow-sporting-equipment, non-limiting examples of which include a snowboard and skis. The braking apparatus 100 comprises a brake bracket 102 with a front section 104. Attached with the front section 104 is a deployable braking section 106. The brake bracket 102 and deployable braking section 106 may be constructed of any suitably rigid material, non-limiting examples of which include plastic and metal. The deployable braking section 106 is attached with the front section 104 of the brake bracket 102 in such a manner as to allow pivotal movement relative to the brake bracket 102.

A user-operated control 108 is operably attached with the deployable braking section 106. The user-operated control 108 may be any suitable mechanism or device allowing a user to deploy the deployable braking section 106, a non-limiting examples of which include a hand-operated control. As illustrated in FIG. 1, the hand-operated control may be a brake-lever squeeze controller.

The brake bracket 102 includes an attachment for attaching with a flexible control 110. The flexible control 110 operably attaches the user-operated control 108 with the deployable braking section 106. The flexible control 110 may be any suitably flexible mechanism or device for operably attaching one medium with another, a non-limiting example of which includes a cable linkage. Through use of the user-operated control 108, the deployable braking section 106 is actuated. When actuated, the deployable braking section 106 is pulled from a closed position to a deployed position. In the deployed position, an outer edge 112 of the deployable braking section 106 is forced downward and into snow upon surface engagement to control the snow-sporting-equipment's terrestrial velocity.

Figure 2:
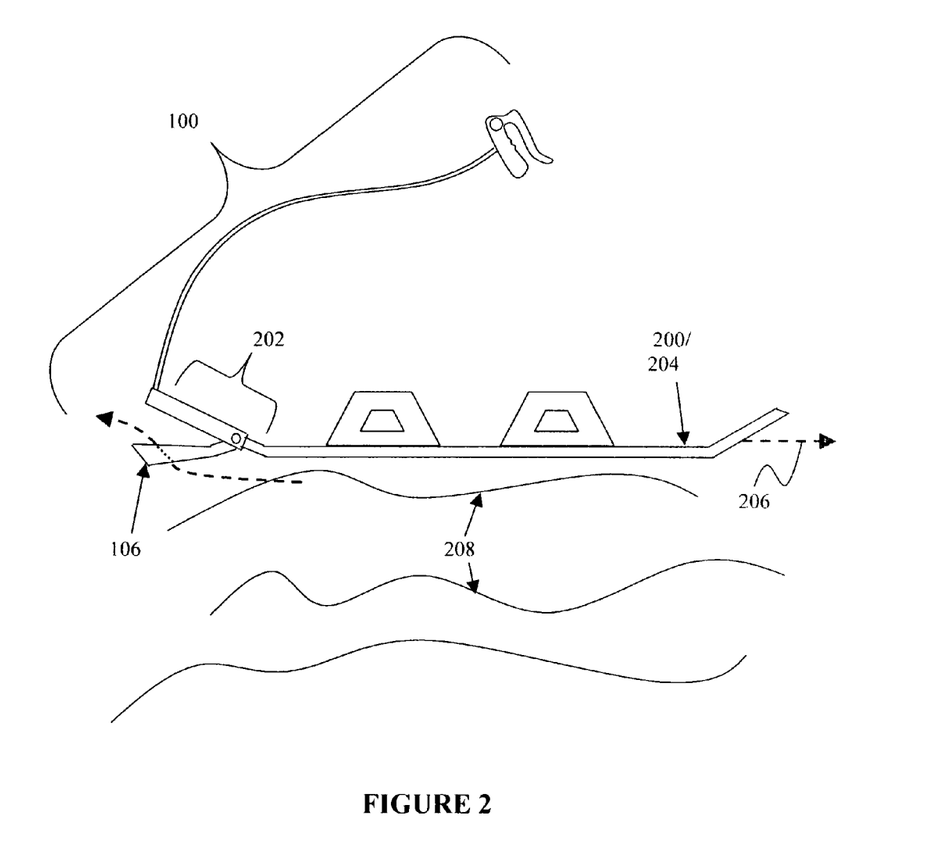
FIG. 2 is a side perspective view of the braking apparatus attached with a snowboard.

FIG. 2 illustrates a braking apparatus 100 attached with a snow-sporting-equipment 200. As illustrated in FIG. 2, the braking apparatus 100 may be attached with a back end 202 of a snowboard 204. When attached with the back end 202 of a snowboard 204, a user may deploy the deployable braking section 106. As further illustrated in FIG. 2, when traveling in a forward direction 206, the deployable braking section 106 can be deployed to create drag and friction in a snow surface 208 in order to control the snowboard's 204 velocity.

Figure 3:
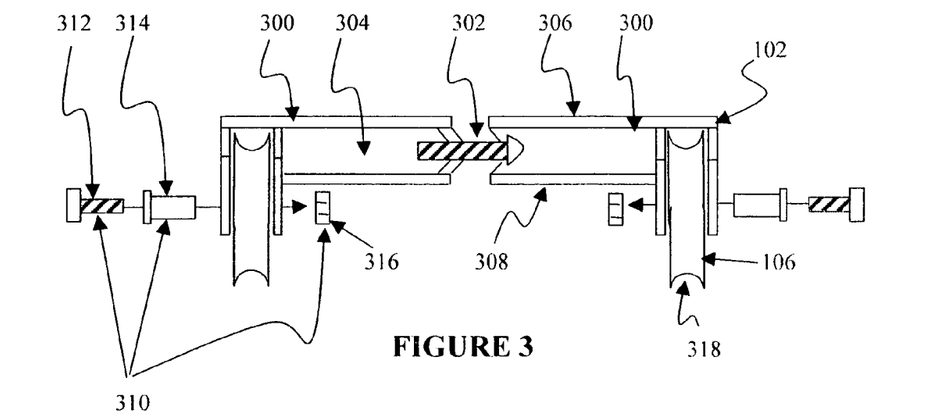
FIG. 3 is a cross-sectional view of the brake bracket attached with a deployable braking section.

FIG. 3 illustrates a cross sectional view of the brake bracket 102 attached with the deployable braking section 106. The brake bracket 102 is adjustably attachable with a piece of snow-sporting-equipment through use of two opposing sides 300. An adjustable fastener 302 connects the two opposing sides 300, allowing the two opposing sides 300 to be adjusted to accommodate snow-sporting-equipment of varying widths. The adjustable fastener 302 may be any suitable mechanism or device to fasten one medium with another, a non-limiting example of which includes screws.

The brake bracket 102 also includes a slot 304 located on an interior rim. The interior rim is located on any suitable side of the brake bracket 102 that is to interact with the snow-sporting-equipment. The slot 304 is shaped to conform with an edge of the snow-sporting-equipment, thereby allowing the brake bracket 102 to be firmly secured with an edge of the snow-sporting-equipment. The brake bracket 102 also includes a top portion 306 and a bottom portion 308.

The brake bracket 102 is firmly attached with a piece of snow-sporting-equipment by sliding an edge of the snow-sporting-equipment into the slot 304. The adjustable fastener 302 is then adjusted to bring the two opposing sides 300 in a suitable position to accommodate a width of the snow-sporting-equipment. The top portion 306 is then tightened against the bottom portion 308, thereby compressing an edge of the snow-sporting-equipment between the top portion 306 and the bottom portion 308 and effectively securing the brake bracket 102 with the piece of snow-sporting-equipment.

The deployable braking section 106 is pivotally attached with the brake bracket 102 through a pivotal attachment 310. The pivotal attachment 310 may be any suitable mechanism or device for pivotally attaching one medium with another, a non-limiting example of which includes a bolt 312, a spacer 314, and a nut 316. In another example, the pivotal attachment 310 may be a hinge. The deployable braking section 106 further includes rounded ends with a recessed track 318. The recessed track 318 accommodates the flexible control, whereby when attached with the flexible control, a user may use the user-operated control to deploy the deployable braking section 106.

Figure 4:
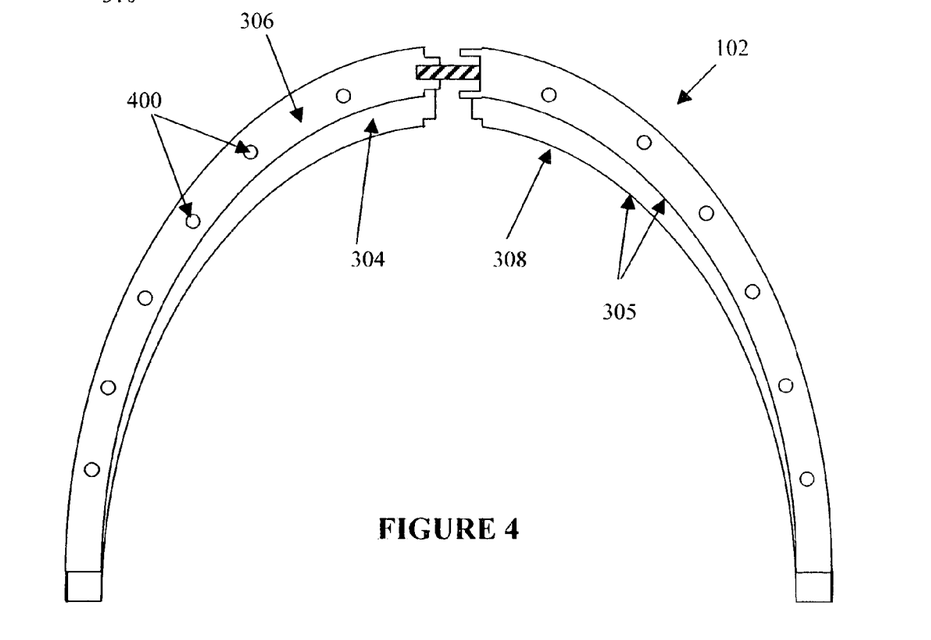
FIG. 4 is a top perspective view of the brake bracket.

FIG. 4 illustrates a top perspective view of the brake bracket 102. The brake bracket 102 includes a plurality of vertical fasteners 400. The vertical fasteners 400 may be any suitable mechanism or device to fasten one medium with another, a non-limiting example of which includes screws. After having slid an edge of the snow-sporting-equipment into the slot 304 on the interior rim 305, the vertical fasteners 400 are used to tighten the top portion 306 against the bottom portion 308, thereby affixing the brake bracket 102 with the snow-sporting-equipment.

Figure 5:
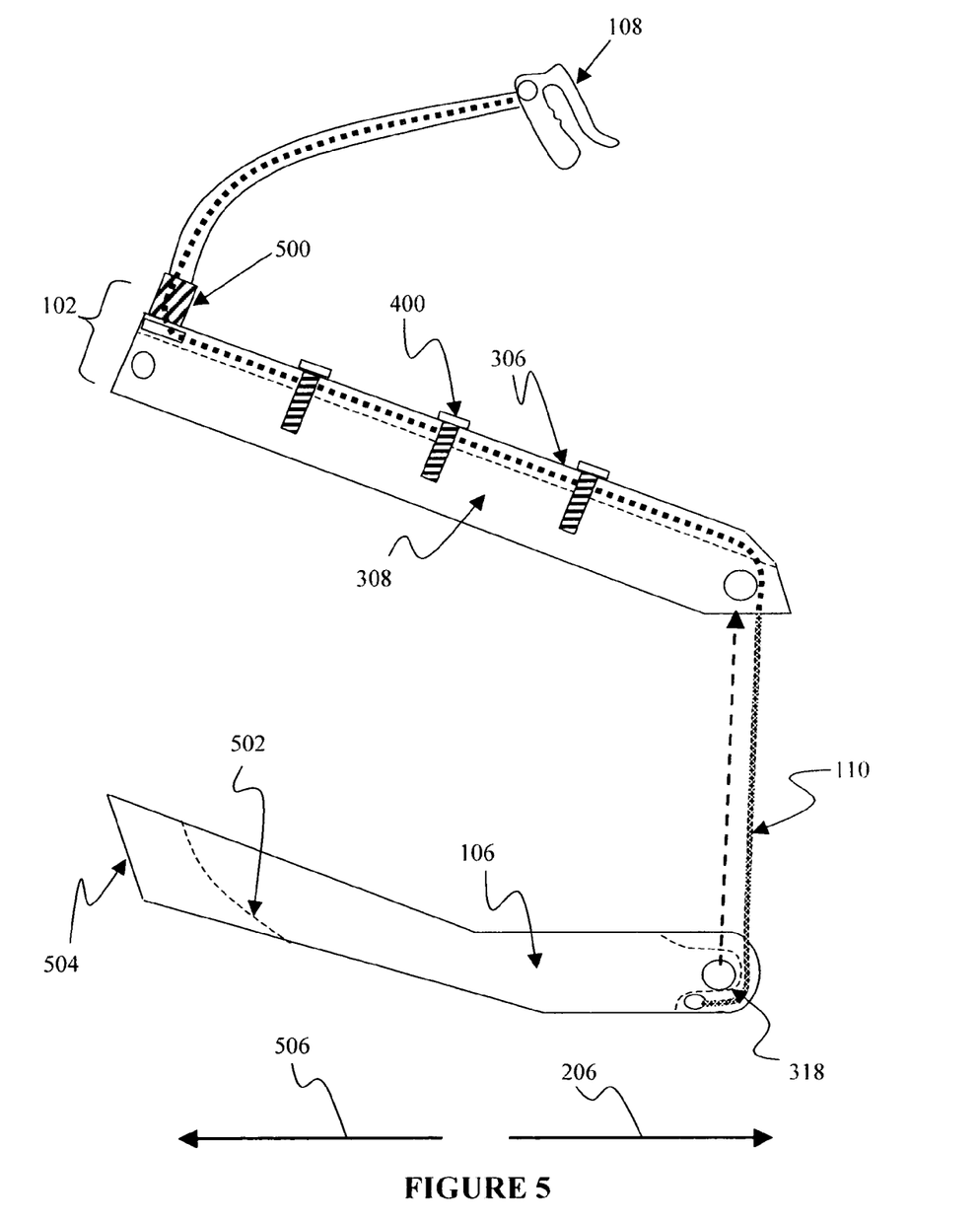
FIG. 5 is a side perspective view of the brake bracket with and an unattached deployable braking section.

FIG. 5 illustrates a side perspective view of the brake bracket 102 and an unattached deployable braking section 106. As shown in FIG. 5, the top portion 306 is tightened against the bottom portion 308 with the vertical fasteners 400. Additionally, the brake bracket 102 includes an attachment 500 for attaching with a flexible control 110. The attachment 500 may be any suitable mechanism or device for affixing one medium with another, a non-limiting example of which includes cable attachment. The flexible control 110 operably attaches the user-operated control 108 with the deployable braking section 106. The deployable braking section 106 includes a rounded end with a recessed track 318 in order to accommodate the flexible control 110.

Through use of the user-operated control 108, the flexible control 110 forces the deployable braking section 106 into a deployed position. The deployable braking section 106 further includes an inside portion 502 with a downward sloping wedge shape. When the deployable braking section 106 is deployed and the snow-sporting-equipment is traveling in a forward direction 206, the wedge shape allows the inside portion 502 to cut into snow upon surface engagement and control the snow-sporting-equipment's terrestrial velocity.

The deployable braking section 106 also includes an outside portion 504 with an upward sloping shape. The upward sloping shape is instrumental when the snow-sporting-equipment is traveling in a backward direction 506. Because of its upward sloping shape, the outside portion 504 reduces friction and drag when traveling in a backward direction 506. By reducing friction and drag, the upward sloping shape helps to prevent the snow-sporting-equipment from catching an edge and causing injury when traveling in a backward direction 506.

Figure 6:
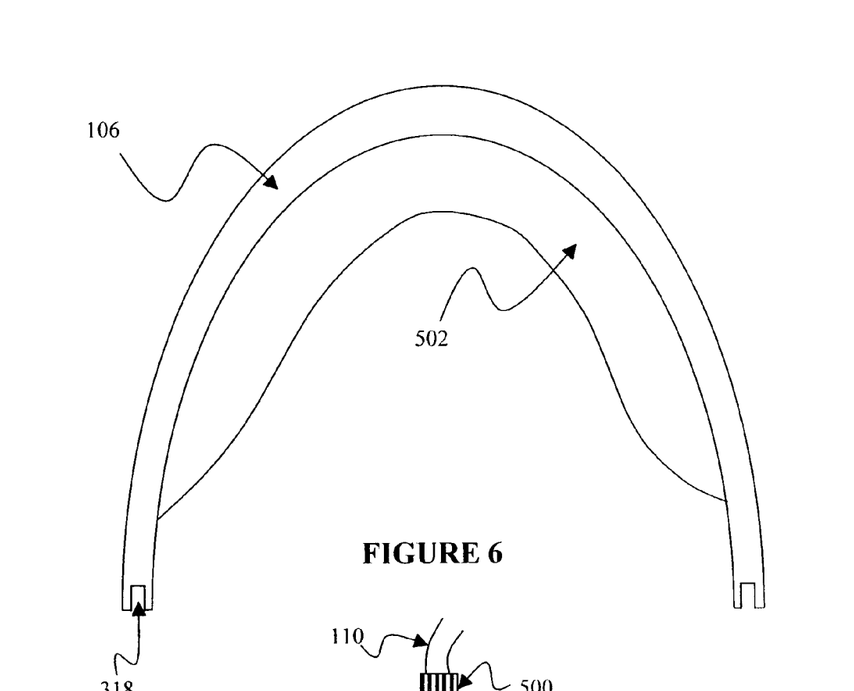
FIG. 6 is a top perspective view of the deployable braking section.

FIG. 6 illustrates a top perspective view of the deployable braking section 106. The deployable braking section 106 includes a recessed track 318 and a wedge shaped inside portion 502. The deployable braking section 106 is shaped in any suitable manner to create friction and drag on the inside portion 502. As illustrated in FIG. 6, the deployable braking section 106 may be u-shaped.

Figure 7:
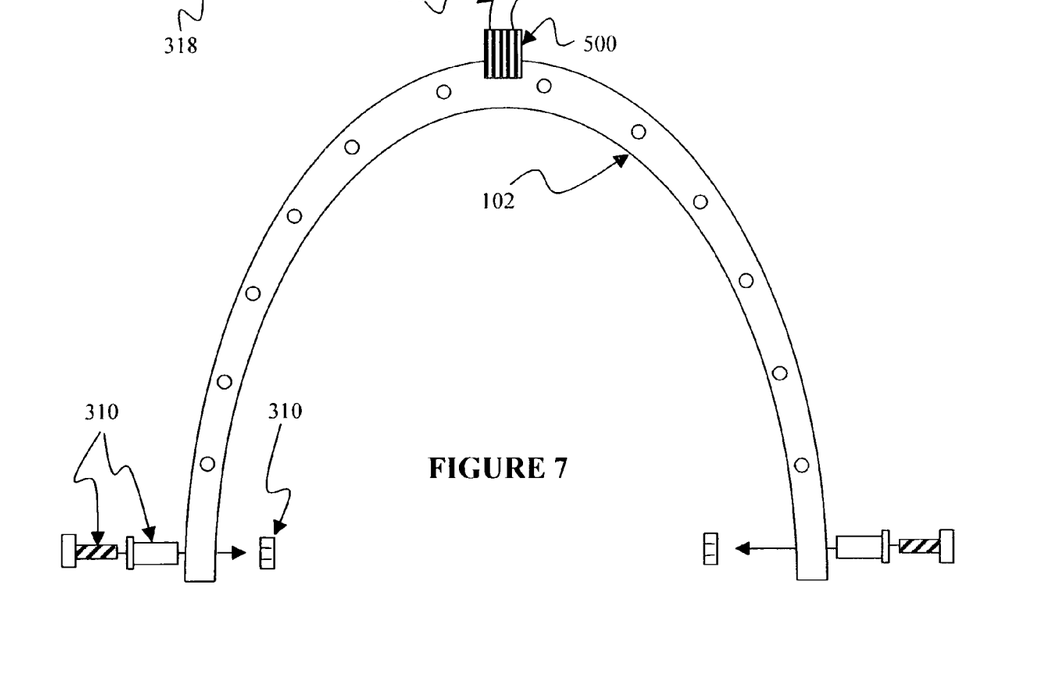
FIG. 7 is a top perspective view of the brake bracket.

FIG. 7 is a top perspective view of the brake bracket 102. The brake bracket 102 attaches with the deployable braking section through a pivotal attachment 310. Additionally, the brake bracket 102 includes an attachment 500 for attaching with a flexible control 110.

Figure 8:
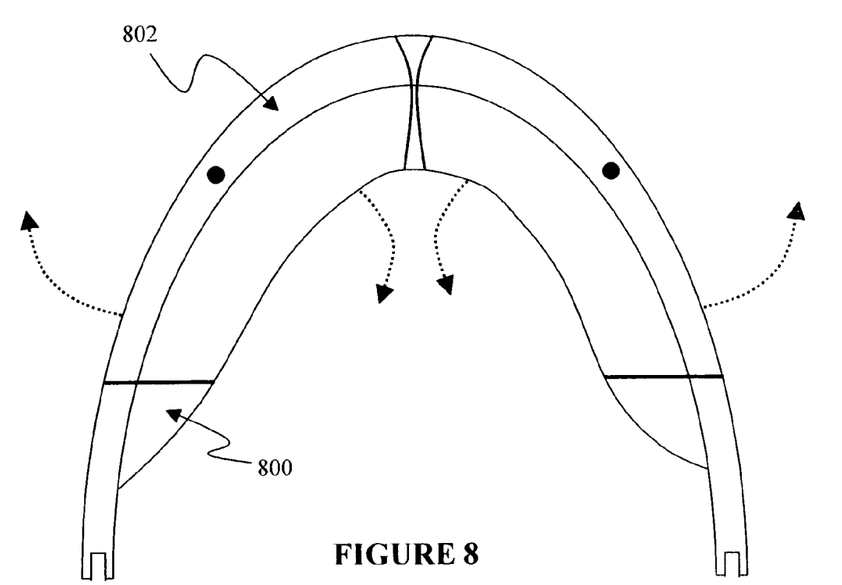
FIG. 8 is top perspective view of friction wings pivotally attached with the deployable braking section.

FIG. 8 is a top perspective view of another aspect of the deployable braking section 800. In this aspect, the deployable braking section 800 includes friction wings 802. The deployable braking section 800 and friction wings 802 may be constructed of any suitable rigid material, non-limiting examples of which include plastic and metal. The friction wings 802 are pivotally attached with the deployable braking section 800 to allow pivotal movement of the friction wings 802. When utilizing the snow-sporting-equipment, the friction wings 802 swing out from the deployable braking section 800 to engage with a snow surface, creating drag and friction in order to control the snow-sporting-equipment' s terrestrial velocity.

Figure 9:
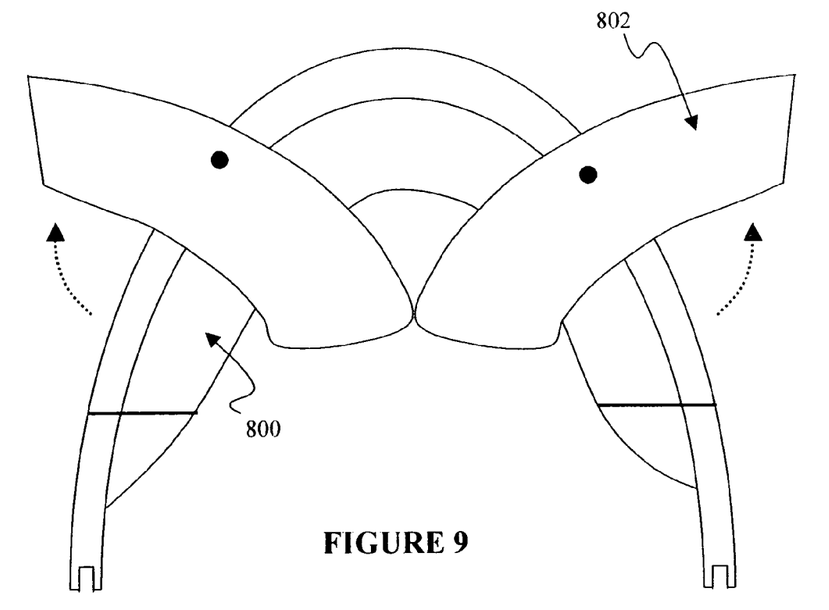
FIG. 9 is a top perspective view of the friction wings as swung out to engage with a snow surface.

FIG. 9 illustrates the deployable braking section 800 with the friction wings 802 swung out to engage with a snow surface.

Figure 10:
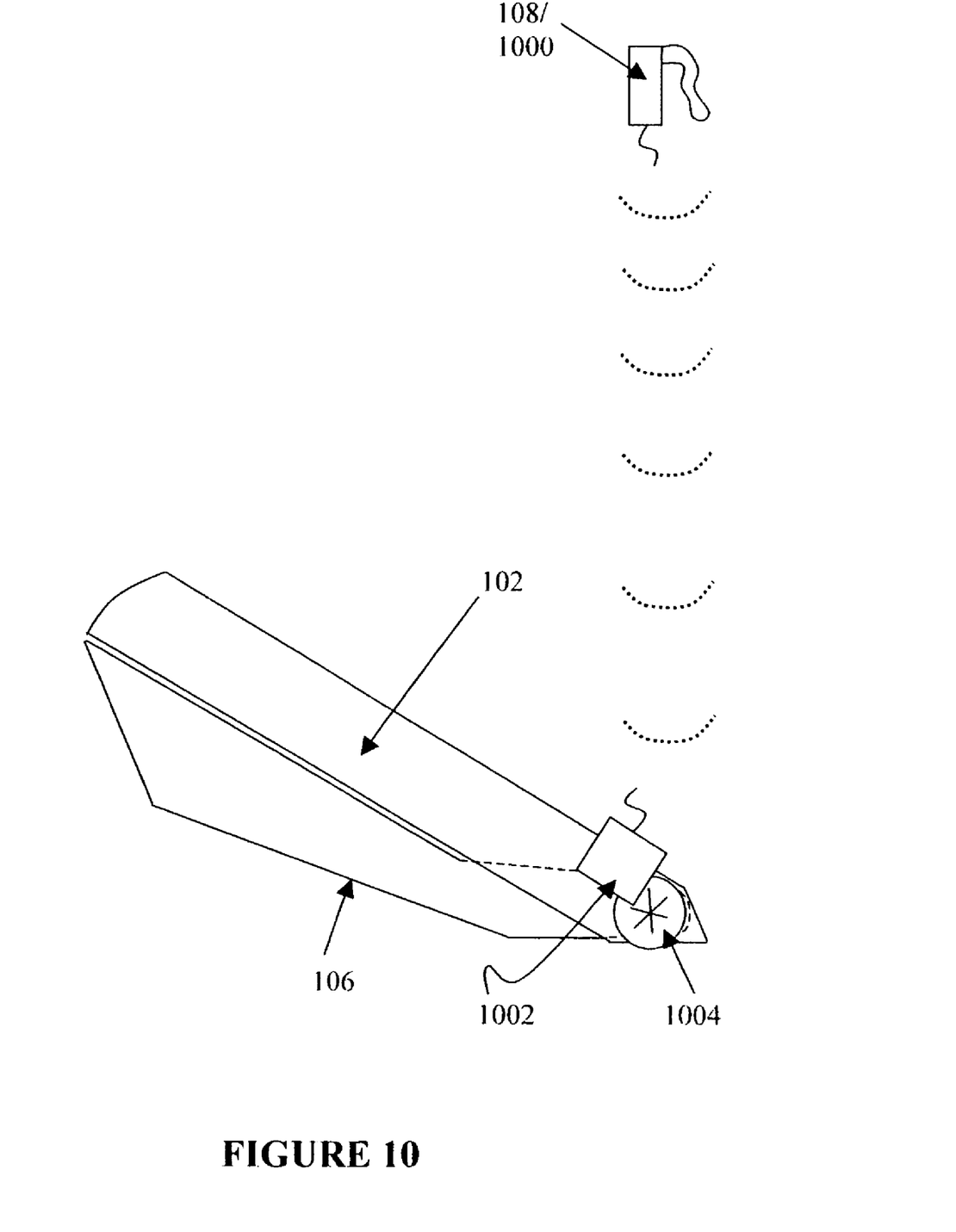
FIG. 10 is a side perspective view of a user-operated control, where the user-operated control is an electronic controller.

FIG. 10 illustrates another aspect of the present invention, where the user-operated control 108 is an electronic controller 1000. As an electronic controller 1000, the user-operated control 108 is operably attached with the deployable braking section 106 through an electronic connection. In this aspect, a signal receiver 1002, and a deployer 1004 are operably attached with the deployable braking section 106. The electronic controller 1000 may be any suitable mechanism or device for receiving a user input and sending a signal to the signal receiver 1002, a non-limiting example of which includes an electric switch with a wireless signal emitter. The signal receiver 1002 may be any suitable mechanism or device for receiving a signal, a non-limiting example of which includes a wireless signal receiver. The deployer 1004 may be any suitable mechanism or device for forcing one object to move in relation to another, non-limiting examples of which include a motor, spring, and pump. Upon receiving a signal from the electronic controller 1000, the signal receiver 1002 actuates the deployer 1004, thereby deploying the deployable braking section 106 in order to control the snow-sporting-equipment' s velocity.

As shown in FIG. 10, the electronic controller 1000 may be a wireless electronic controller, where the user-operated control 108 is operably attached with the deployable braking section 106 through an electronic wireless connection.

What is claimed is:

1. A rider-operated, snow-sporting-equipment braking apparatus, permitting a rider to control a sporting equipment's terrestrial velocity, comprising:
   a brake bracket for attaching with a piece of snow-sporting-equipment;
   a deployable braking section attached with the brake bracket, thereby allowing pivotal movement relative to the brake bracket;
   a user-operated control operably attached with the deployable braking section;
   wherein the brake bracket is removably attached with the snow-sporting-equipment;
   wherein the brake bracket further comprises:
      two opposing sides, where each of the two opposing sides have a top portion and a bottom portion; and
      an adjustable fastener connecting the two opposing sides, whereby the brake bracket may be removably attached with a snow-sporting-equipment by:
      adjusting the adjustable fastener to bring the two opposing sides in such a position as to accommodate a width of the snow-sporting-equipment; and
      tightening the top portion with the bottom portion, thereby compressing an edge of the snow-sporting-equipment between the top portion and the bottom portion,
   whereby through user manipulation, the deployable braking section is actuated to control the snow-sporting-equipment's terrestrial velocity.

2. A rider-operated, snow-sporting-equipment braking apparatus as set forth in claim 1, wherein the brake bracket further comprises a slot located on an interior rim, where the slot is shaped to conform with an edge of the snow-sporting-equipment, thereby allowing the brake bracket to be firmly secured with an edge of the snow-sporting-equipment.

3. A rider-operated, snow-sporting-equipment braking apparatus as set forth in claim 2, wherein the deployable braking section further comprises an inside portion with a downward sloping wedge shape, whereby when deployed, the wedge shape allows the inside portion to cut into snow upon surface engagement and control the snow-sporting-equipment'terrestrial velocity.

4. A rider-operated, snow-sporting-equipment braking apparatus as set forth in claim 3, wherein the deployable braking section further comprises an outside portion with a upward sloping shape, whereby upon surface engagement, the upward sloping shape reduces friction and drag, thereby helping to prevent the snow-sporting-equipment from catching an edge and causing injury when traveling in a backward direction.

5. A rider-operated, snow-sporting-equipment braking apparatus as set forth in claim 4, wherein the user-operated control is a hand operated control.

6. A rider-operated, snow-sporting-equipment braking apparatus as set forth in claim 5, wherein the brake bracket further comprises an attachment for attaching with a flexible control.

7. A rider-operated, snow-sporting-equipment braking apparatus as set forth in claim 6, further comprising a flexible control attaching the user-operated control with the deployable braking section.

8. A rider-operated, snow-sporting-equipment braking apparatus as set forth in claim 7, wherein the flexible control is a cable linkage.

9. A rider-operated, snow-sporting-equipment braking apparatus as set forth in claim 8, wherein the deployable braking section further comprises rounded ends with a recessed track, thereby accommodating a cable linkage, whereby when attached with the cable linkage, a user may use the user-operated control to deploy the deployable braking section through use of the cable linkage.

10. A rider-operated, snow-sporting-equipment braking apparatus as set forth in claim 9, wherein the snow-sporting-equipment braking apparatus further comprises friction wings pivotally attached with the deployable braking section, whereby when utilizing the snow-sporting-equipment, the friction wings swing out to engage with a snow surface, creating drag and friction in order to control the snow-sporting-equipment's terrestrial velocity.

11. A rider-operated, snow-sporting-equipment braking apparatus as set forth in claim 10, wherein the snow-sporting-equipment is a snowboard.

12. A rider-operated, snow-sporting-equipment braking apparatus as set forth in claim 1, wherein the brake bracket further comprises an attachment for attaching with a flexible control.

13. A rider-operated, snow-sporting-equipment braking apparatus as set forth in claim 12, wherein the flexible control is a cable linkage.

14. A rider-operated, snow-sporting-equipment braking apparatus as set forth in claim 1, wherein the user-operated control is a hand operated control.

15. A rider-operated, snow-sporting-equipment braking apparatus as set forth in claim 1, further comprising a flexible control attaching the user-operated control with the deployable braking section.

16. A rider-operated, snow-sporting-equipment braking apparatus as set forth in claim 15, wherein the flexible control is a cable linkage.

17. A rider-operated, snow-sporting-equipment braking apparatus as set forth in claim 1, wherein the snow-sporting-equipment braking apparatus further comprises friction wings pivotaly attached with the deployable braking section, whereby when carving on the snow-sporting-equipment, the friction wings swing out to engage a snow surface and further create drug and friction in order to control the snow-sporting-equipment's terrestrial velocity.

18. A rider-operated, snow-sporting-equipment braking apparatus, permitting a rider to control a sporting equipment's terrestrial velocity, comprising:
   a brake bracket for attaching with a piece of snow-sporting-equipment;
   a deployable braking section attached with the brake bracket, thereby allowing pivotal movement relative to the brake bracket;
   a user-operated control operably attached with the deployable braking section;
   wherein the brake bracket further comprises:
   two opposing sides, where each of the two opposing sides have a top portion and a bottom portion; and
   a fastener connecting the two opposing sides, whereby the brake bracket may be removably attached with a snow-sporting-equipment by:
      adjusting the fastener to bring the two opposing sides in such a position as to accommodate a width of the snow-sporting-equipment; and
      tightening the top portion with the bottom portion, thereby compressing an edge of the snow-sporting-equipment between the top portion and the bottom portion.

19. A rider-operated, snow-sporting-equipment braking apparatus, permitting a rider to control a sporting equipment's terrestrial velocity, comprising:

a brake bracket for attaching with a piece of snow-sporting-equipment;

a deployable braking section attached with the brake bracket, thereby allowing pivotal movement relative to the brake bracket;

a user-operated control operably attached with the deployable braking section;

wherein the brake bracket further comprises a slot located on an interior rim, where the slot is shaped to conform with an edge of the snow-sporting-equipment, thereby allowing the brake bracket to be firmly secured with an edge of the snow-sporting-equipment.

20. A rider-operated, snow-sporting-equipment braking apparatus, permitting a rider to control a sporting equipment's terrestrial velocity, comprising:

a brake bracket for attaching with a piece of snow-sporting-equipment;

a deployable braking section attached with the brake bracket, thereby allowing pivotal movement relative to the brake bracket;

a user-operated control operably attached with the deployable braking section, whereby through user manipulation, the deployable braking section is actuated to control the snow-sporting-equipment's terrestrial velocity; and wherein the deployable braking section further comprises an inside portion with a downward sloping wedge shape, whereby when deployed, the wedge shape allows the inside portion to cut into snow upon surface engagement and control the snow-sporting-equipment's terrestrial velocity.

21. A rider-operated, snow-sporting-equipment braking apparatus, permitting a rider to control a sporting equipment's terrestrial velocity, comprising:

a brake bracket for attaching with a piece of snow-sporting-equipment;

a deployable braking section attached with the brake bracket, thereby allowing pivotal movement relative to the brake bracket;

a user-operated control operably attached with the deployable braking section, whereby through user manipulation, the deployable braking section is actuated to control the snow-sporting-equipment's terrestrial velocity; and wherein the deployable braking section further comprises an outside portion with a upward sloping shape, whereby upon surface engagement, the upward sloping shape reduces friction and drag, thereby helping to prevent the snow-sporting-equipment from catching an edge and causing injury when traveling in a backward direction.

22. A rider-operated, snow-sporting-equipment braking apparatus, permitting a rider to control a sporting equipment's terrestrial velocity, comprising:

a brake bracket for attaching with a piece of snow-sporting-equipment;

a deployable braking section attached with the brake bracket, thereby allowing pivotal movement relative to the brake bracket;

a user-operated control operably attached with the deployable braking section, whereby through user manipulation, the deployable braking section is actuated to control the snow-sporting-equipment's terrestrial velocity;

wherein the deployable braking section further comprises rounded ends with a recessed track, thereby accommodating a cable linkage, whereby when attached with the cable linkage, a user may use the user-operated control to deploy the deployable braking section through use of the cable linkage.

23. A rider-operated, snow-sporting-equipment braking apparatus, permitting a rider to control a sporting equipment's terrestrial velocity, comprising:

a brake bracket for attaching with a piece of snow-sporting-equipment;

a deployable braking section attached with the brake bracket, thereby allowing pivotal movement relative to the brake bracket;

a user-operated control operably attached with the deployable braking section;

wherein the user-operated control is operably attached with the deployed braking section through an electronic connection, such that the user can deploy the deployable braking section while riding the snow-sporting-equipment to control the user's terrestrial velocity while riding the snow-sporting-equipment; and wherein the deployable braking section further comprises an inside portion with a downward wedge shape, whereby when deployed, the wedge shape allows the inside portion to cut into snow upon surface engagement and control the snow-sporting-equipment's terrestrial velocity.

24. A rider-operated, snow-sporting-equipment braking apparatus as set forth in claim 23, wherein the electronic connection is a wireless connection.

25. A method for making a rider-operated, snow-sporting-equipment braking apparatus, comprising acts of:

attaching a deployable braking section with a brake bracket, thereby allowing pivotal movement relative to the brake bracket; and operably attaching a user-operated control with the deployable braking section;

wherein in the act of attaching the deployable braking section with the brake bracket, the brake bracket further includes:

two opposing sides, where each of the two opposing sides have a top portion and a bottom portion; and an adjustable fastener connecting the two opposing sides, whereby the brake bracket may be removably attached with a snow-sporting-equipment by:

adjusting the adjustable fastener to bring the two opposing sides in such a position as to accommodate a width of the snow-sporting-equipment; and tightening the top portion with the bottom portion, thereby compressing an edge of the snow-sporting-equipment between the top portion and the bottom portion, whereby through user manipulation, the deployable braking section is actuated to control the snow-sporting-equipment's terrestrial velocity.

26. A method for making a rider-operated, snow-sporting-equipment braking apparatus as set forth in claim 25, wherein in the act of operably attaching a user-operated control with the deployable braking section, the user-operated control is a hand-operated control.

* * * * *